March 22, 1960 E. BOBARD 2,929,638
MULTIPLE STEERING SYSTEM FOR VEHICLES
Filed Nov. 4, 1955 2 Sheets-Sheet 1
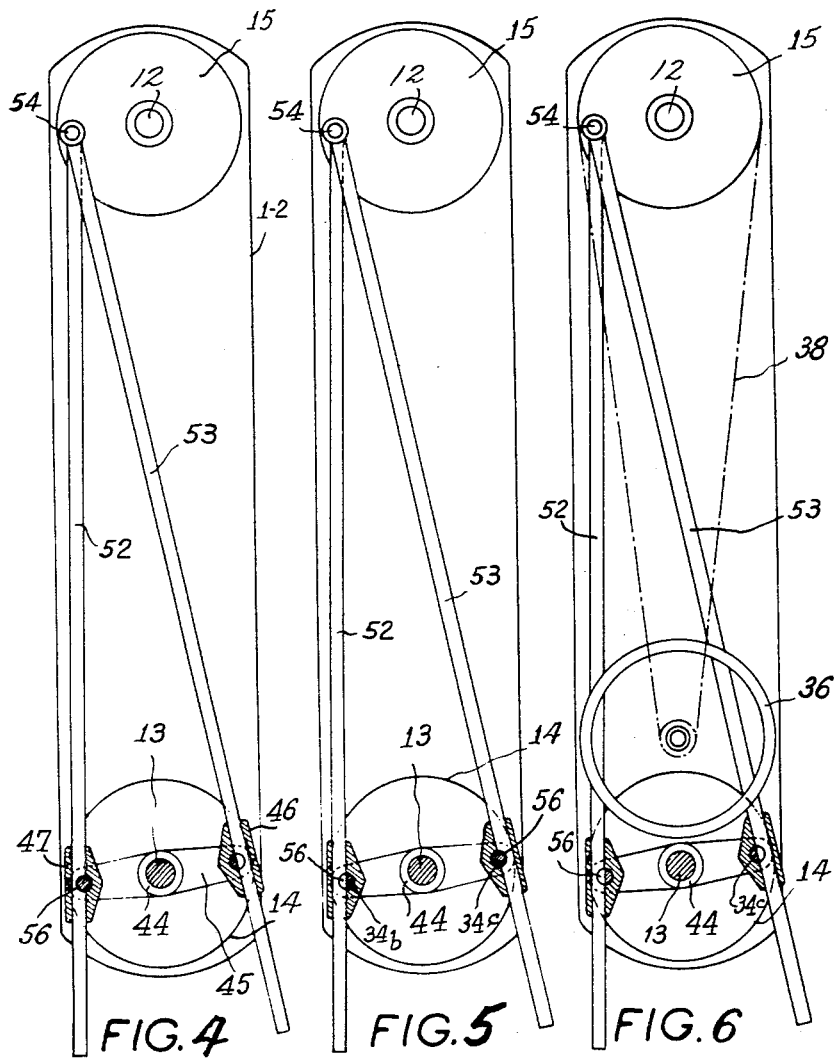
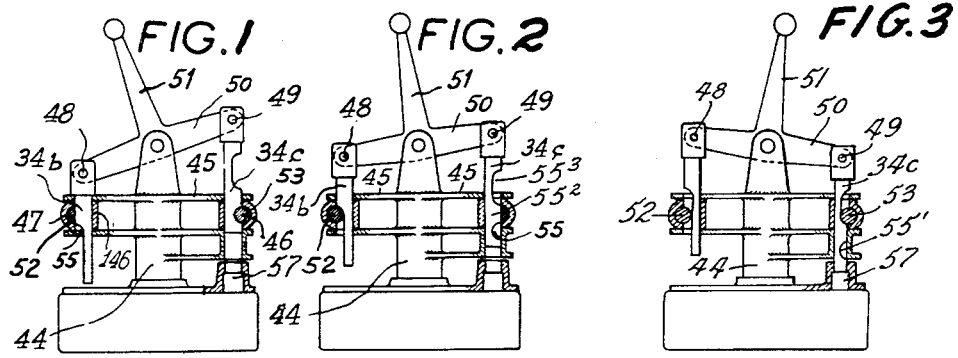

March 22, 1960   E. BOBARD   2,929,638
MULTIPLE STEERING SYSTEM FOR VEHICLES
Filed Nov. 4, 1955   2 Sheets-Sheet 2
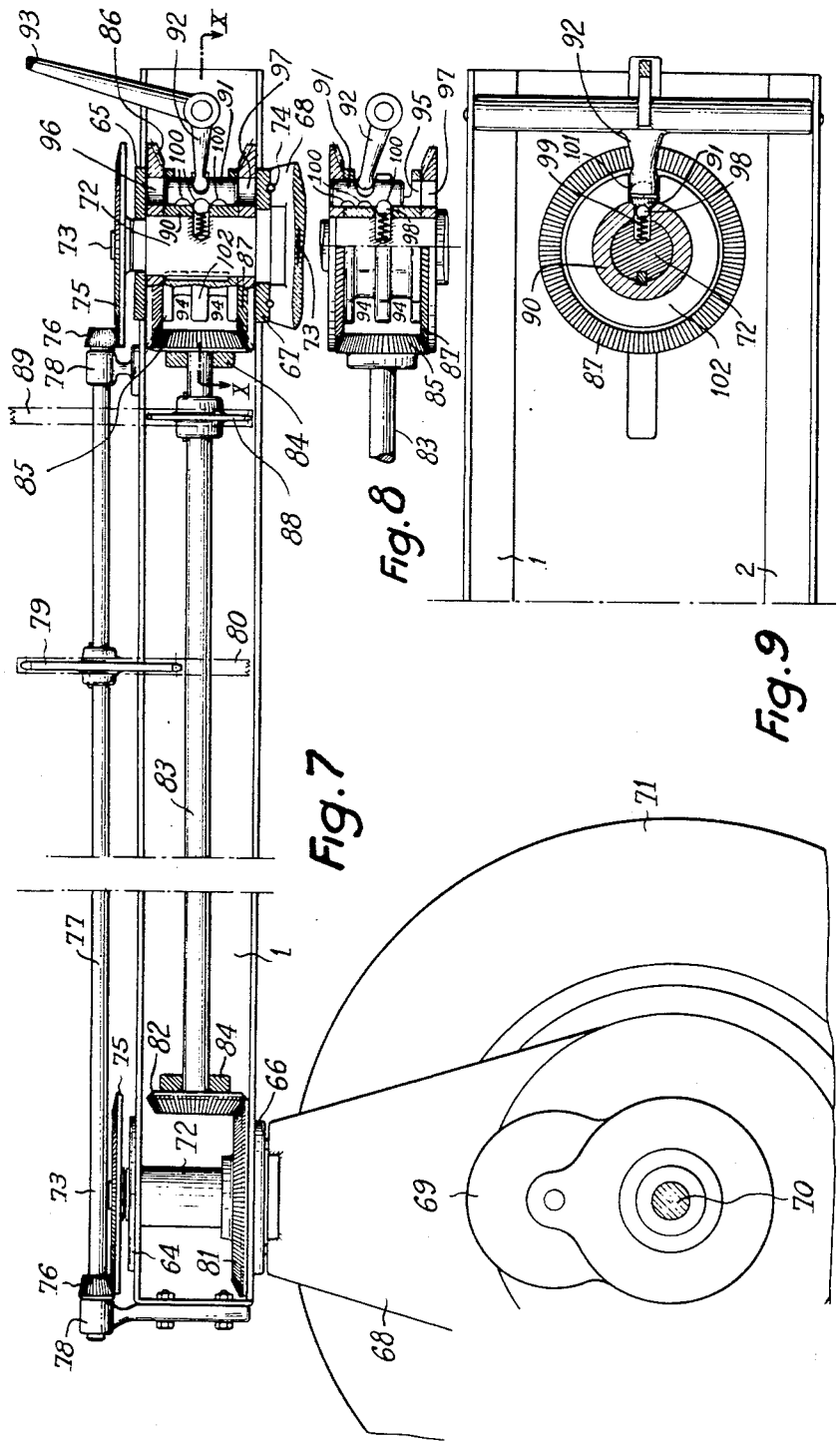

United States Patent Office 2,929,638
Patented Mar. 22, 1960

2,929,638

MULTIPLE STEERING SYSTEM FOR VEHICLES

Emile Bobard, Beaune, France

Application November 4, 1955, Serial No. 545,019

Claims priority, application France November 6, 1954

8 Claims. (Cl. 280—95)

This invention relates to improved multiple steering systems for vehicles, and to vehicles equipped with such systems. Certain types of vehicles have been provided with means for simultaneously turning the front and the rear wheels thereof in reverse directions in order to reduce the turning radius as compared to what would be obtained if only the front wheels of the vehicle were turned while the rear wheels were retained in an angularly fixed direction parallel to the direction of travel as is the case with more conventional types.

Other types of vehicles have been provided with means for simultaneously turning the front and rear wheels in a common direction, thereby permitting the vehicle to be driven in a direction other than along its longitudinal axis, e.g. sideways or crabwise.

It is desirable in connection with certain uses to which a vehicle may be put, that the front wheels be steered with a suitable manual steering control, while the rear wheels would be orientable selectively in the same direction as the front wheels, or in a reverse direction therefrom, or again that they may be retained in their normal centered condition. It is general object of this invention to provide such a vehicle.

The desideratum just specified is particularly important in connection with farming vehicles and machines which are put to a variety of different jobs at different times. It is advantageous and desirable to employ a single vehicle or machine which is adapted to be readily modified to suit the various types of work which it may have to perform. It is therefore an object of this invention to provide a general purpose vehicle or tractor of this character, wherein the only modification required involves the setting of a single selector control.

A specific object of this invention is to provide a vehicle wherein the rear wheels may be selectively fixed in their normal centered condition, or coupled with the front wheels for simultaneous angular movement therewith during steering.

Another object is to provide a tractor wherein the rear wheels may be locked in a normal centered condition, or may selectively be coupled for simultaneous deflection with the front wheels, in the same direction or in reverse directions, as desired.

Still another object is to provide such a vehicle which involves the use of a single common steering member, e.g. steering wheels, regardless of the particular type of steering that is being employed.

A further and important object is the provision of such a vehicle wherein selection between the various available types of steering systems thereon will be effected by the setting of a single selector member.

The invention is especially though not exclusively applicable to laterally-stabilized vehicles supported on two aligned wheels pivoted on vertical pivots from a raised chassis. However, the invention may likewise be applied to great advantage in connection with four or more wheeled vehicles, in which case the control means described herein may be applied to the common transverse tie-bar or to a truck or train of wheels somewhat similar to a locomotive truck. The use of vertical pivots is of partcular advantage in that it permits of readily coupling the front and rear wheel trucks, as by a coupling bar connected to both pivots in eccentric relation thereto as will be more fully explained. The wheel may then be supported from a pivotal support which may selectively be locked for movement with its driving member when it is desired to couple both wheels, or locked to the chassis when the wheel is to be retained in centered condition.

Some embodiments of the invention will now be described for purposes of illustration but not of limitation with reference to the accompanying drawings, wherein:

Figs. 1, 2 and 3 illustrate in elevation the selector mechanism of the invention and the three figures relate respectively to the case where both wheels are deflected in the same direction, in reverse directions and rear wheel locked;

Figs. 4, 5 and 6 are corresponding plan views;

Fig. 7 is an elevational view, part in section, showing a tractor embodying a further modification of the invention, in the centered-and-locked condition of the rear wheel;

Fig. 8 shows a partial section through the upper part of the rear assembly of the tractor shown in Fig. 7 in the condition where both wheels are arranged for deflection in the same sense; and Fig. 9 is a section on the line X—X of Fig. 7.

Referring to Figures 1-6 of the drawing, a tractor chassis is shown at 1—2 supporting adjacent its ends two pivot structures 14 and 15 supporting the front and rear wheels respectively, not illustrated. Secured to rear pivot 14 is an upstanding tubular casing 44 having vertically spaced horizontal arms 45 projecting to either side thereof. Pivoted between said arms about vertical axes defined by a pair of movable pins 34b and 34c extending through apertures in said arms, are a pair of sleeves 46 and 47 respectively. Slidably received in the sleeves are the rear ends of a pair of coupling bars 52 and 53 respectively, the forward ends of which are pivoted to a common point 54 of the front wheel pivot disc 15. Means are provided for selectively locking either one of the coupling bars in its related sleeve and simultaneously releasing the other coupling bar for sliding displacement in its sleeve. When bar 52 is locked and bar 53 released, it will be obvious that the front and rear wheels will be deflected in the same direction, the opposite being true when bar 53 is locked in its sleeve and bar 52 released. A selector lever 51 is pivoted in a clevis-shaped top portion of the casing 44 and has a pair of lateral arms 50 projecting therefrom and having their ends pivoted at 48 and 49 to the tops of respective locking pins 34b and 34c. These pins extend vertically downwards through registering apertures formed in the fixed arms 45 as well as through vertical bores formed through both sleeves 46, 47, such vertical bores being at right angles to the horizontal bores of said sleeves through which the coupling bars 52, 53 extend.

The coupling bars 52 and 53 are each formed with a semi-circular notch therethrough, the arrangement being such that in the normal centered condition of the wheels said notches are aligned with the vertical bores through the sleeves. The pin 34b has a cut 55 extending over part of its length from the lower end thereof, so that a lower part section of the pin is in the form of a semi-cylindrical section, whereas its upper part constitutes a full or solid cylindrical section. Thus, when the pin 34b is in a depressed position as shown in Fig. 1, the solid upper section of the pin runs through the semi-circular notch 56 in the related coupling bar 52, thereby locking the bar against sliding displacement in the sleeve 47. When however the pin 34b is raised a sufficient amount as in either Fig. 2 or 3, to withdraw the solid upper section of the pin out of the notch 56 in the bar, and bring the semi-circular lower section of the pin adjacent to said notch, the bar can shift freely in its sleeve.

The other pin 34c associated with the bar 53 has a somewhat different formation. Projecting from the pivot disc 15 beneath and in line with the pin 34c is an upstanding boss having an aperture 57. The pin 34c has a full or solid lower end portion which is adapted to project into this aperture when in the fully depressed or lower position shown in Fig. 3. In this condition moreover, a cut-out $55^3$ formed in the uppermost section of the pin is positioned adjacent the notch 56 in the bar 53. Furthermore, intermediate this cut-out and the lower end of the pin 34c the pin is formed with another cut-out 55'.

The operation of the system shown in Figs. 1–6 will be obvious from a consideration of these figures. Thus, when the selector lever 51 is moved to a first position (Fig. 1) pin 34b has its solid portion extending in the notch in the bar 52 locking this bar against axial movement in its sleeve, while pin 34c has its cutout 55' adjacent the bar 53 so that this bar is free to move axially in its sleeve. In this condition therefore the coupling between the front and rear pivots 12 and 13 is effected through bar 52, and the steering deflections of both front and rear wheels will be in similar directions.

Moving selector lever 51 to an intermediate position (Fig. 2) brings the cut-out part of pin 34b opposite the bar 52, releasing this bar, and brings the solid intermediate part $55^2$ of pin 34c into the notch 56 of bar 53, locking the bar in its sleeve. The rear and front wheel pivots are now coupled through the crossed-over bar 53, and the steering deflections will be accomplished in opposite directions.

Finally if the selector lever is moved to a third position (Fig. 3) beyond the position just described, pin 34b still has its cut-out portion positioned for release of bar 52, and pin 34c now has its upper cut-out portion positioned to release 53 also; however the lower end of pin 34c now projects into boss 57 to lock the rear pivot 14, so that the rear wheel is fixed in the centered condition and steering is accomplished with the front wheel only.

As shown in Fig. 6, steering torque may be transmitted from the steering wheel 36 to the front wheel pivot 12 through a chain drive 38.

It will be noted that the notches 56 in the coupling bars are so positioned as to permit vertical displacements of the pins 34b and 34c only when both front and rear wheels are in their centered or aligned positions. Thus the operator is only able to shift the selector lever to pass from one type of steering to another when the vehicle is in its straight-away condition.

An embodiment of the invention will now be described with reference to Figs. 7–9, which includes provision for unlimited steering rotation of the front and rear wheels about the vertical axes of the associated pivots.

As shown in these figures, 2 designates one of the side members of the chassis of a tractor or similar vehicle. Rotatable in sets of upper and lower bearings 64, 66 and upper and lower bearings 65, 67 provided in the chassis near each of its ends are pivots 72, 72, each upstanding from a wheel supporting arm or bracket 68, in the lower part of which is journalled a stub axle 70 supporting the wheel 71 thereon. Each pivot 72 is tubular. Extending rotatably therethrough is a vertical shaft 73 which is adapted to be driven in rotation from the vehicle motor, in a manner presently to be described, and to transmit the drive to the axle 70 through suitable reduction gearing, not shown, housed in a casing portion 69 of the wheel support.

The means for transmitting the drive to both the front and rear wheels comprise a longitudinal shaft 77 journalled in suitable bearings 78 on the chassis and having secured on each of its ends a bevel pinion 76 meshing with a bevel gear 75 secured on the top of shaft 73. The shaft 77 has a sprocket wheel 79 secured on an intermediate point thereof and connected through a chain drive 80 with the motor drive shaft, not shown.

Secured to the lower end of the front wheel pivot 72 is a bevel gear 81 which meshes with a pinion 82 secured on the near end of a shaft 83 journalled on the chassis in bearings 84. The other or rear end of shaft 83 has another pinion 85 secured to it. This pinion meshes simultaneously with a pair of oppositely disposed bevel gears 86 and 87 rotatably mounted about the rear pivot 72. Means are provided for selectively locking the gear pivot for rotation with either one of the gears 86 and 87 whereby the rear pivot may be made to assume steering deflections in the same direction as, or in reverse direction from, the front wheel pivot.

The shaft 83 is adapted to be rotated for steering purposes by means of a sprocket 88 secured on it and connected with a chain drive 89 with a sprocket mounted on the steering shaft, not shown.

Selection of the coupling direction between the front and rear wheels is effected by the following means. Surrounding the rear pivot 72 between the upper and lower bevel annuli 86, 87 and keyed to the pivot, is an annular member 90. A circular bore formed vertically through the wall of the member 90 has a pin 91 slidably received in it and adapted when moved upward or downwardaway, from a centered position to project with its upper or lower end into apertures 96 and 97 formed in the upper and lower bevel gears 86 and 87 respectively. The pin can be shifted by means of a finger 92 having a ball shaped end swivelled in a transverse cutout of the pin and actuatable with a selector level 93. The annular member 90 has a pair of circumferential grooves 94 formed in its periphery and separated by a solid portion constituting a projecting rib 102. When the lever 93 is actuated to shift the pin to either of its projected positions, e.g. the uppermost position as shown in Fig. 8, wherein it engages the upper annular gear 86 to lock this gear for rotation with the pivot, it will be seen from Fig. 8 that the finger 92 will not interfere with the free rotation of the pivot 72 and annular member 90, owing to the provision of the cutout in the pin 91 and the circumferential grooves 94. The rear wheel pivot is coupled for rotation with the front wheel pivot, in the same or the opposite direction, according as the pin 91 was moved into engagement with the upper gear 86 or the lower gear 87 respectively. When on the other hand the selector lever 93 is positioned to place the pin 91 in its centered position as in Fig. 7, the finger 92 extends into engagement with the pin cutout through an aperture 101 formed in the circumferential rim portion 102 of member 90, then it will be seen that the finger 92 serves to lock the entire assembly including annular member 90, pivot 72 and the rear wheel structure depending therefrom, in a centered position relatively to the chassis. It will be evident that in this as in the other embodiments of the selector device of the invention hereinabove described, the selector member 93 cannot be shifted to alter the type of steering operation unless both front and rear wheels are aligned with each other and with the longitudinal axis of the vehicle. This is because it is only in this condition that the bores 95, 96 and 97 are aligned with each other and with the finger 92.

Detent means comprising a spring-pressed ball 98 received in a socket formed in the pivot adapted to engage either one of three sockets formed in the pin 34d, are provided for yieldingly retaining the pin in the selected one of its three settings.

It will be appreciated that the last described embodiment is equivalent in effect to the embodiments previously described with reference e.g. to Figs. 1 to 6. The embodiment of Figs. 7 and 8 provides for unlimited rotation of the front and rear wheel pivots a full 360°. An additional advantage over the form shown in Figs. 1 to 6 is that the length of the coupling shaft such as 83 is not critical and may readily be provided with extensible, e.g. telescopic means, for fitting the selective coupling system to vehicles of diverse lengths.

Various modifications may be made in the forms illustrated and described herein without exceeding the scope of the invention.

What I claim is:

1. In a vehicle having a frame, front wheel means steerably pivoted to the frame, rear wheel means steerably pivoted to the frame first disengageable means coupling said front and rear wheel means for simultaneous steering displacements in similar directions, second disengageable means coupling said front and rear wheel means for simultaneous steering displacements in opposite directions, third disengageable means locking said rear wheel means with respect to the frame in a centered condition of said rear wheel means, a common selector member connected with said coupling means and said locking means and actuatable to any one of three positions in each of which a related one of said first, second and third means is engaged and the remaining two means are disengaged, and a steering control for imparting steering displacements to said front wheel means.

2. In a vehicle having a frame, front wheel means steerably pivoted to the frame, rear wheel means steerably pivoted to the frame, first disengageable means operative when engaged to couple said front and rear wheel means for simultaneous steering displacement in similar directions, second disengageable means operative when engaged to couple said front and rear wheel means for simultaneous steering displacement in reverse directions, third disengageable means operative when engaged to lock one of said wheel means relative to said frame in a centered condition with respect thereto, a selector member connected with said disengageable means and actuatable to any one of three positions in each of which a related one of said disengageable means is engaged and the other two thereof are disengaged, and a steering control for imparting steering displacements to at least one of said wheel means.

3. In a vehicle of the type described, a frame, front and rear vertical pivot means rotatably supported on said frame, front and rear wheels respectively supported from said pivot means in a position for supporting said vehicle on the ground, first and second disengageable means coupling said front and rear pivot means for simultaneous rotation thereof in similar and in reverse directions respectively, third disengageable means for locking one of said pivots in a centered position thereof relative to the frame, a selector member operable to any one of three positions in each of which one and only one of said disengageable means is engaged, and a steering control for imparting steering displacements to one of said pivot means.

4. In a vehicle of the type described, a frame, front and rear pivot means supported from said frame for rotation about generally vertical axes, front and rear wheels respectively supported from said pivot means in positions for supporting the vehicle on the ground, a bar having one of its ends pivoted to one of said pivot means at a point displaced from the said axis thereof, a sleeve slidably receiving the opposite end portion of said bar and means pivoting said sleeve on the other one of said pivot means at a point displaced from the axis thereof, first disengageable means for locking said opposite bar-end-portion to said sleeve, second disengageable means for locking said one pivot means to the frame, a selector member connected with both said locking means and actuatable to either one of two positions for engaging a related one of said locking means and disengaging the other locking means, and a steering control member connected with said one pivot means for imparting steering rotation thereto.

5. In a vehicle as claimed in claim 4, in which to achieve the locking function there is provided a transverse aperture through the walls of one of said sleeves, a notch in the bar that slides in such sleeve, said notch being adapted to register with said aperture, a pin having a cutout portion and a solid locking portion, said pin being slidable in said aperture between a position in which said cutout portion is located adjacent said bar to permit free sliding displacement of the bar in the sleeve, and a position in which said locking portion extends through said bar notch to lock the bar against sliding displacement in the sleeve, and means connecting said pin with said selector member for displacing the pin between its positions on actuation of the selector member.

6. In a vehicle as claimed in claim 4, in which to achieve the locking function there is provided a transverse aperture through the walls of one of said sleeves, a notch in the bar that slides in such sleeve, said notch being adapted to register with said aperture, a pin slidable in said aperture and including a recessed releasing portion and a locking portion, a socket on said other pivot means adapted for locking cooperation with an end portion of said pin, said pin being slidable between a first position wherein said releasing portion thereof is adjacent said bar and said end portion projects into said socket, and a second position wherein said locking portion extends through the bar notch and said end portion is clear of said socket, and means connecting said pin with said selector member for displacing the pin between its positions.

7. In a vehicle of the type described, a frame, front and rear pivot means supported from said frame for rotation about generally vertical axes, front and rear wheels supported from said respective pivot means for supporting the vehicle on the ground, a first bar having one of its ends pivoted to one of said pivot means at a point displaced from the axis thereof, a second bar having a related end pivoted to said one pivot means at a point adjacent said first point, sleeves slidably receiving the opposite end portions of said respective bars, means pivoting said sleeves on the other one of said pivot means at points respectively located on the same side and the opposite side of said axis thereof as said first point, first and second disengageable means for locking said respective bars against sliding displacement in their respective sleeves, third disengageable means for locking said other means to the frame in a centered position of the related wheel means, a selector member connected with all said locking means and actuatable to any one of three positions for engaging a related one and only one of said three locking means, and a steering control member connected with said one pivot means for imparting steering rotation thereto.

8. In a vehicle as claimed in claim 7, a transverse aperture through each sleeve, a recess in each bar adapted to register with the related sleeve aperture, a pin slidable in each sleeve aperture and formed with respective locking and releasing portions, each pin slidable between a first and a second position wherein a releasing and a locking portion thereof, respectively, is located adjacent said bar recess to permit and prevent displacement of the bar in the related sleeve, a movable selector member; and means connecting said selector member to both pins whereby movement of the member to a first position will place one pin in its locking and the other pin in its releasing position, movement of the member to a second position will place said one in its releasing and said other pin in its locking position, and movement of the member to a third position will place both pins in their releasing positions, and cooperating locking means on one of said pins and the related pivot means adapted for engagement in said third position of the selector member for locking said last mentioned pivot means against rotation.

References Cited in the file of this patent

UNITED STATES PATENTS

| | | |
|---|---|---|
| 991,485 | Darron | May 9, 1911 |
| 1,045,922 | Willard | Dec. 3, 1912 |
| 1,107,990 | Pamer | Aug. 18, 1914 |
| 1,255,775 | Mueller | Feb. 5, 1918 |
| 2,228,247 | Cunningham | Jan. 14, 1941 |
| 2,272,603 | Ellis | Feb. 10, 1942 |
| 2,339,205 | Tapp | Jan. 11, 1944 |
| 2,388,692 | House | Nov. 13, 1945 |
| 2,470,496 | Krilanovich | May 17, 1949 |
| 2,650,100 | Ronning | Aug. 25, 1953 |
| 2,715,534 | Hoge et al. | Aug. 16, 1955 |
| 2,812,194 | Ajero | Nov. 5, 1957 |

FOREIGN PATENTS

| | | |
|---|---|---|
| 1,026,020 | France | Apr. 22, 1953 |